(12) United States Patent
Blaker et al.

(10) Patent No.: US 8,330,569 B2
(45) Date of Patent: Dec. 11, 2012

(54) SYSTEM AND METHOD FOR RECEIVING DATA FOR TRAINING A TRAINABLE TRANSMITTER

(75) Inventors: David A. Blaker, Holland, MI (US); Matthew W. Cardwell, Rock, MI (US)

(73) Assignee: Johnson Controls Technology Company, Holland, MI (US)

( * ) Notice: Subject to any disclaimer, the term of this patent is extended or adjusted under 35 U.S.C. 154(b) by 847 days.

(21) Appl. No.: 10/558,121

(22) PCT Filed: May 28, 2004

(86) PCT No.: PCT/US2004/017058
§ 371 (c)(1),
(2), (4) Date: Nov. 21, 2006

(87) PCT Pub. No.: WO01/67413
PCT Pub. Date: Sep. 13, 2001

(65) Prior Publication Data
US 2007/0176735 A1  Aug. 2, 2007

Related U.S. Application Data

(60) Provisional application No. 60/473,786, filed on May 28, 2003.

(51) Int. Cl.
*G05B 19/00* (2006.01)
(52) U.S. Cl. .................. 340/5.22; 340/5.71; 340/426.14
(58) Field of Classification Search .................. None
See application file for complete search history.

(56) References Cited

U.S. PATENT DOCUMENTS

| 4,390,877 A | | 6/1983 | Curran |
| 4,760,394 A | | 7/1988 | Takeuchi et al. |
| 4,792,796 A | * | 12/1988 | Bradshaw et al. ....... 340/539.21 |
| 4,825,200 A | * | 4/1989 | Evans et al. ..................... 341/23 |
| 5,627,529 A | | 5/1997 | Duckworth et al. |
| 5,854,593 A | * | 12/1998 | Dykema et al. ............ 340/12.23 |
| 6,020,654 A | | 2/2000 | Chutorash |
| 6,144,114 A | | 11/2000 | Chutorash |
| 6,181,255 B1 | * | 1/2001 | Crimmins et al. ......... 340/12.28 |

(Continued)

FOREIGN PATENT DOCUMENTS

EP  0 660 542 A1  6/1995

(Continued)

OTHER PUBLICATIONS

International Search Report for PCT/US2004/017058, date of mailing Oct. 15, 2004, 3 pages.

(Continued)

*Primary Examiner* — Jennifer Mehmood
*Assistant Examiner* — Brian Wilson
(74) *Attorney, Agent, or Firm* — Foley & Lardner LLP

(57) ABSTRACT

A system for receiving data for training a trainable transmitter used to subsequently transmit a modulated RF signal having the received data includes an antenna, a capacitive detection circuit and a control circuit. The capacitive detection circuit is coupled to the antenna and configured to detect data provided in a control signal of a remote control transmitter used to remotely actuate a device. The control circuit is coupled to the capacitive detection circuit and is configured to store the received data and to generate the RF signal having the received data to be transmitted by the trainable transmitter to actuate the device.

7 Claims, 5 Drawing Sheets

U.S. PATENT DOCUMENTS

| | | | |
|---|---|---|---|
| 6,188,889 B1 * | 2/2001 | Tsai | 455/420 |
| 6,282,152 B1 * | 8/2001 | Kurple | 368/10 |
| 6,282,407 B1 * | 8/2001 | Vega et al. | 455/41.1 |
| 6,336,031 B1 * | 1/2002 | Schyndel | 455/41.2 |
| 6,556,813 B2 * | 4/2003 | Tsui | 455/92 |
| 6,615,023 B1 * | 9/2003 | Ehrensvard | 455/41.1 |
| 6,978,126 B1 * | 12/2005 | Blaker et al. | 455/352 |
| 7,116,229 B1 | 10/2006 | Miramontes | |
| 7,257,426 B1 | 8/2007 | Witkowski et al. | |
| 7,346,374 B2 | 3/2008 | Witkowski et al. | |
| 7,349,722 B2 | 3/2008 | Witkowski et al. | |
| 2005/0242970 A1 | 11/2005 | Blaker et al. | |
| 2006/0158344 A1 | 7/2006 | Bambini et al. | |
| 2006/0214813 A1 | 9/2006 | Witkowski et al. | |
| 2006/0232376 A1 | 10/2006 | Blaker | |
| 2006/0232377 A1 | 10/2006 | Witkowski | |
| 2007/0057810 A1 | 3/2007 | Bos et al. | |
| 2007/0152798 A1 | 7/2007 | Witkowski | |
| 2007/0197172 A1 | 8/2007 | Witkowski et al. | |
| 2008/0068205 A1 | 3/2008 | Witkowski | |
| 2008/0192659 A1 | 8/2008 | Santavicca | |
| 2008/0221742 A1 | 9/2008 | DiCroce | |

FOREIGN PATENT DOCUMENTS

| | | |
|---|---|---|
| EP | 1 959 410 A1 | 8/2008 |
| EP | 1 052 609 B1 | 3/2009 |
| WO | WO 00/75905 A1 | 12/2000 |
| WO | WO0167413 * | 9/2001 |
| WO | WO 2004/043750 A2 | 5/2004 |
| WO | WO 2004/077729 A2 | 9/2004 |
| WO | WO 2005/002080 A1 | 1/2005 |
| WO | WO 2008/079811 A1 | 7/2008 |

OTHER PUBLICATIONS

Written Opinion for International Patent Application No. PCT/US2004/017058, mailed Oct. 15, 2004, 7 pages.

http://en.wikipedia.org/wiki/Near_Field_Communication, believed to be available by at least Dec. 3, 2008, 11 pages.

Office Action received for U.S. Appl. No. 12/328,663, dated Nov. 23, 2011, 13 pages.

International Search Report and Written Opinion for International Patent Application No. PCT/US2009/065855, dated Jun. 11, 2010, 15 pages.

* cited by examiner

SYSTEM AND METHOD FOR RECEIVING DATA FOR TRAINING A TRAINABLE TRANSMITTER

CROSS-REFERENCE TO RELATED APPLICATIONS

This application claims the benefit of U.S. Provisional Application No. 60/473,786, filed May 28, 2003.

FIELD OF THE INVENTION

The present invention relates to a trainable radio frequency (RF) transmitter and particularly to a trainable transmitter for a vehicle that transmits a control signal to a remotely controlled device.

BACKGROUND OF THE INVENTION

Electronically operated remote control systems, such as garage door openers, home security systems, home lighting systems, etc. are becoming increasingly common. Such electronic remote control systems typically employ a battery powered portable RF transmitter for transmitting a modulated and encoded RF signal to a receiver located at the remote control system. For example, a garage door opener system may include a receiver located within the homeowner's garage. The garage door receiver is tuned to the frequency of its associated portable RF transmitter and demodulates a predetermined code programmed into both the portable transmitter and receiver for operating the garage door. Conventional portable transmitters have consisted of a portable housing which typically is clipped to a vehicle's visor or otherwise loosely stored in the vehicle.

As an alternative to a portable transmitter, a trainable transceiver (e.g., a remote control transceiver) may be provided in vehicles for use with remote control devices such as garage door openers, gate controllers, alarm controls, home lighting systems, etc. Typically, a trainable transceiver may learn and store the modulation scheme (i.e., code format), transmission codes and the particular RF carrier frequencies of one or more OEM (original equipment manufacturer) remote transmitters for use with the remote control devices. A vehicle owner may train the transceiver to the vehicle owner's existing remote RF transmitter. Subsequently, the old remote RF transmitter can be discarded and stored. A trainable transceiver includes receiver circuitry to receive a control signal from a remote transmitter during a training process.

To enhance security of remote control devices, manufacturers have implemented cryptographic algorithms in their original transmitters and receivers that transmit and respond to randomly varying codes. To enable a vehicle-installed trainable transmitter to effectively operate in such systems, trainable transmitters have been developed that have the capability of recognizing when a received signal has been originated from a transmitter that generates a code that varies with each transmission in accordance with a cryptographic algorithm. When such a variable code is recognized, the trainable transmitter determines which cryptographic algorithm is used to generate and transmit the next code to which the receiver will respond.

SUMMARY OF THE INVENTION

In accordance with one embodiment, a system for receiving data for training a trainable transmitter used to subsequently transmit a modulated RF signal having the received data includes an antenna, a capacitive detection circuit coupled to the antenna and configured to detect data provided in a control signal of a remote control transmitter used to remotely actuate a device and a control circuit coupled to the capacitive detection circuit and configured to store the received data and generate the RF signal having the received data to be transmitted by the trainable transmitter to actuate the device.

In accordance with another embodiment, a method for training a trainable transmitter on a vehicle used to subsequently transmit a modulated RF signal having characteristics of a control signal used to remotely actuate a remote electronic system includes initiating a training sequence and activating a remote transmitter associated with the remote electronic system to provide the control signal. The method also includes capacitively detecting data of the control signal transmitted by the remote transmitter. Once the data is detected, it is stored in a memory.

BRIEF DESCRIPTION OF THE DRAWINGS

The invention will be more readily understood by reference to the following description taken with the accompanying drawings, in which.

DETAILED DESCRIPTION OF THE PREFERRED AND OTHER EXEMPLARY EMBODIMENTS

Figure 1:
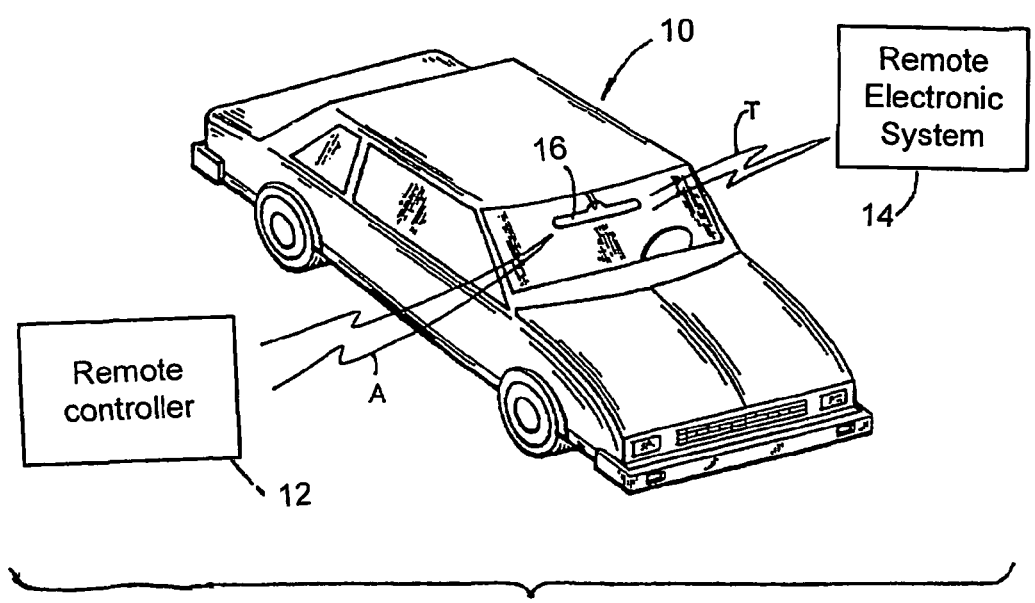
FIG. 1 shows a remote control system and a vehicle having a trainable transmitter in accordance with an embodiment.

FIG. 1 shows a remote control system and a vehicle having a trainable transmitter in accordance with an embodiment. Vehicle 10 is an automobile, although it should be understood that the trainable transmitter of the present invention may be embodied in other vehicles or other systems such as a portable housing. The system as illustrated in FIG. 1 also includes a portable remote transmitter 12 for a remote electronic system 14. Remote transmitter 12 may be in the form of, for example, a remote controller. Remote electronic system or device 14 may be an electronic system such as a garage door opener, home security system, home lighting system, electronically operated access gates, or any other household appliance or system capable of receiving an RF control signal, etc. A trainable transmitter 34 (see, FIG. 2) is included in a control module which may be mounted within the vehicle 10 inside, for example, a rearview mirror 16 or other suitable location such as an overhead console, a visor, a dashboard, etc.

The trainable transmitter (not shown) in vehicle 10 may be trained using remote transmitter 12 which is used to control remote electronic system 14. Coded radio frequency (RF) (or infrared) energy (or control signal) of remote transmitter 12 is transmitted as indicated by arrow A to the trainable transmitter 34 (see FIG. 2) of the control module mounted to, for example, rearview mirror 16. The trainable transmitter (not shown) receives the encoded control signal, demodulates it and a programmable control circuit of the transmitter learns the control code (e.g., fixed or rolling code) and determines a carrier frequency for the signal and stores this information for later transmission. The trainable transmitter may then be used to selectively generate and transmit an RF control signal with the frequency and learned control code as indicated by arrow T to remote electrical system 14, such as, for example, a garage door opening mechanism, that is responsive to the control signal. The programmable control circuit controls a transmitter to generate a carrier signal and modulate the control code (e.g., fixed or rolling code) onto a carrier signal to generate a control signal. The operation of the programmable control circuit and the trainable transmitter are described in detail below.

Figure 2:
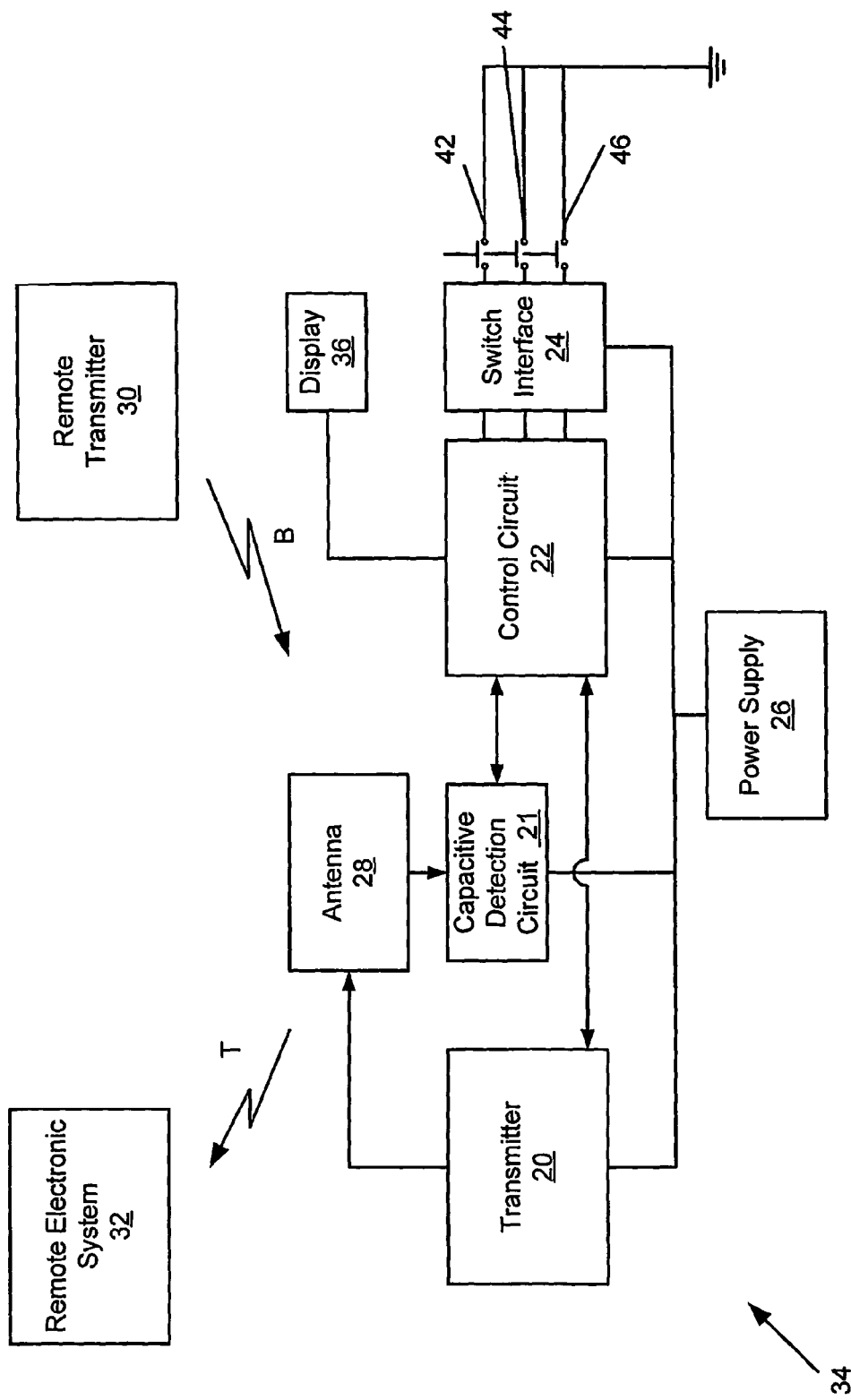
FIG. 2 is a schematic block diagram of a trainable transmitter system in accordance with an embodiment.

FIG. 2 is a schematic block diagram of a trainable transmitter 34 in accordance with an embodiment. Trainable transmitter 34 shown in FIG. 2 includes a transmitter circuit 20 that is coupled to an antenna 28 and a control circuit 22. Control circuit 22 is configured to control the various portions of trainable transmitter 34, to store data in memory, to operate preprogrammed functionality, etc. Control circuit 22 may include various types of control circuitry, digital and/or analog, and may include a microprocessor, microcontroller, application specific integrated circuit (ASIC), or other digital and/or analog circuitry configured to perform various input/output, control, analysis, and other functions to be described herein. Control circuit 22 is coupled to an operator input device which may include one or more push button switches 42, 44, 46, but may alternatively include other user input devices such as, switches, knobs, dials, etc., or even a voice-actuated input control circuit configured to receive voice signals from a vehicle occupant and to provide such signals to control circuit 22 for control of trainable transmitter 34. A switch interface 24 is connected to one terminal of each of the three push button switches 42, 44 and 46, which have their remaining terminal connected to ground. Switches 42, 44 and 46 may each be associated with a separate remote control system to be controlled each of which may have their own unique operating RF frequency, modulation scheme, and/or control code. Thus, switches 42, 44 and 46 correspond to a different radio frequency channel for transmitter circuit 20.

An interface circuit 24 couples signal information from switches 42, 44 and 46 to the input terminals of control circuit 22. Control circuit 22 includes data input terminals for receiving signals from the switch interface 24 indicative of the closure states of switches 42, 44 and 46. Control circuit 22 may also be coupled to a display 36 which includes a light emitting diode (LED). Display 36 may alternatively include other display elements, such as a liquid crystal display (LCD), a vacuum florescent display (VFD) or other display elements. A power supply 26 is conventionally coupled to the various components for supplying their necessary operating power in a conventional manner, and can be coupled to a vehicle battery or other power source.

Once the RF channel associated with one of the switches 42, 44, and 46 has been trained (as described in more detail below) to a control signal B transmitted from a portable, remote transmitter 30 associated with a remote electronic system 32 (e.g., a garage door opener), transmitter circuit 20 may be used to transmit an RF signal T having the same characteristics as the control signal B to actuate remote electronic system 32. The transmission of the RF signal T may be invoked by, for example, momentarily depressing the corresponding switch 42, 44 or 46. Thus, by identifying and storing signal characteristics such as carrier frequency, modulation scheme and control code or data code of a received RF control signal B originating from remote transmitter 30, trainable transmitter 34 may subsequently transmit an RF signal T having the identified signal characteristics of the RF control signal that are necessary to activate remote electronic system 32. As mentioned, each RF channel may be trained to a different RF control signal such that a plurality of devices or systems may be activated by depressing a corresponding one of the switches 42, 44 or 46.

Transmitter circuit 20 includes transmit circuitry configured to communicate via antenna 28 with remote electronic system 32. Transmitter circuit 20 is configured to transmit wireless control signals having control data which will control the remote electronic system 32. The control data in the wireless control signal may be a fixed code or a rolling code or other cryptographically encoded control code for use with the remote electronic system 32. As mentioned, the control code and modulation data for the remote electronic system 32 are learned using an original remote transmitter 30 for the remote electronic system 32.

Figure 3:
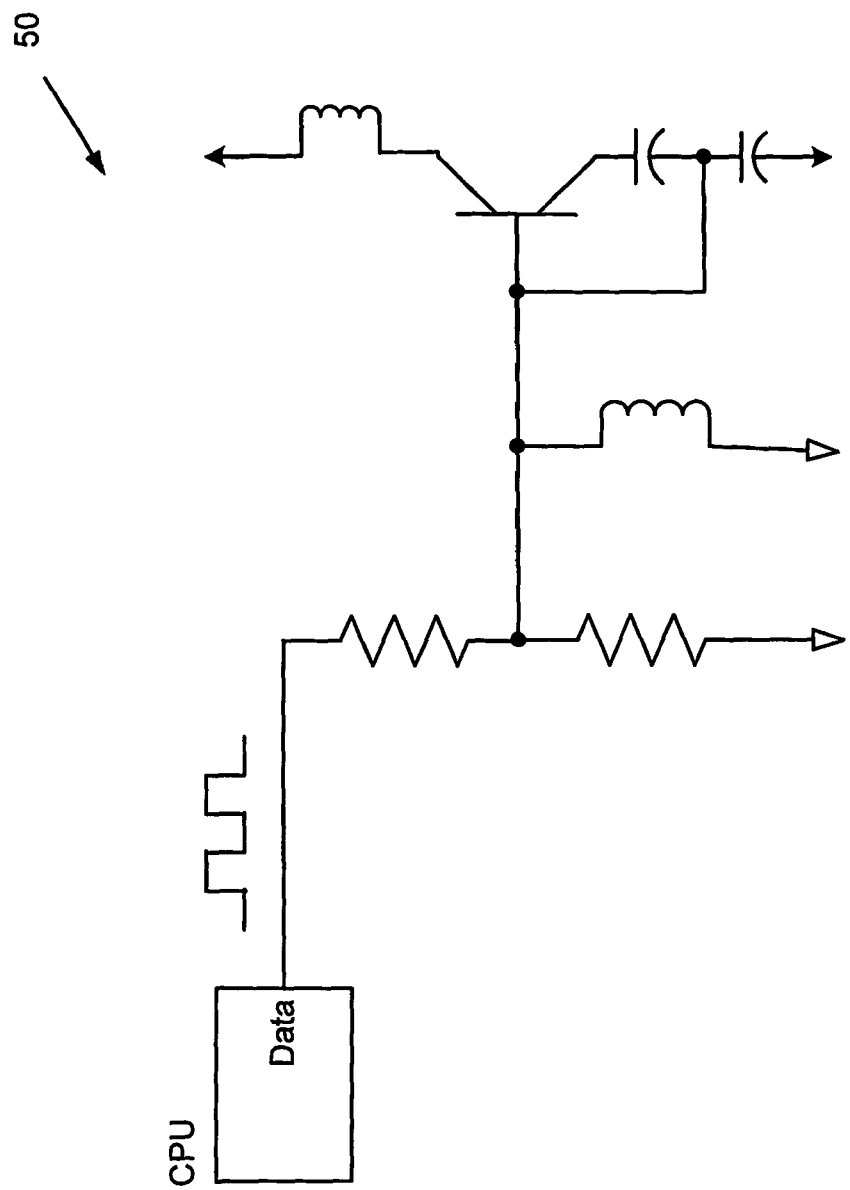
FIG. 3 is an exemplary circuit diagram for a remote transmitter for an electronic system in accordance with an embodiment.

Remote transmitter 30 is used to send an RF control signal B (including a control code and a carrier frequency) to the trainable transmitter. Trainable transmitter includes a capacitive detection circuit 21 which is coupled to antenna 28 and control circuit 22. Capacitive detection circuit 21 is used to capacitively detect the modulation data of the control signal from remote transmitter 30. Accordingly, an RF receiver or detector is not required in trainable transmitter 34. Remote transmitters for an electronic system, such as remote transmitter 30, commonly use On-Off Keying (OOK) modulation. On-Off Keying modulation is a simplified version of amplitude shift key (ASK) or AM modulation. In the OOK modulation technique, modulation is accomplished by turning a transmitter circuit on and off. Typically, this is done by controlling the bias voltage on the RF oscillator transmitter (remote transmitter 30). An exemplary transmitter circuit 50 for an original remote transmitter 30 is shown in FIG. 3.

Figure 4A:
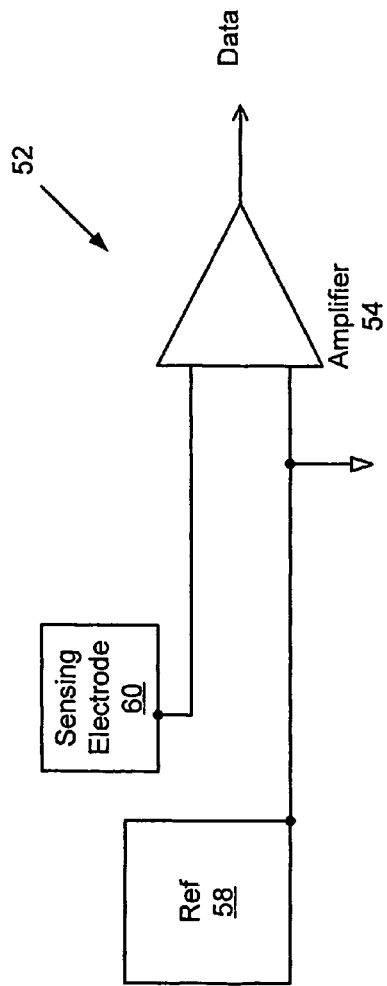
FIG. 4A is a circuit diagram of a capacitive detection circuit in accordance with an embodiment.

Capacitive coupling may be used to detect the voltage change of the remote transmitter 30 control signal. An exemplary circuit diagram for capacitive detection circuit 21 is shown in FIG. 4A. Preferably, a larger ground or reference plate or electrode 58 is used in capacitive detection circuit 52. A smaller sensing electrode 60 is used in capacitive detection circuit 52 to detect the signal of the on-off control of remote transmitter 30 (see FIG. 2). The larger reference electrode 58 of capacitive detection circuit 52 tends to couple to the larger portion of the transmitter circuit 50 (see FIG. 3). With proper positioning of remote transmitter 30 with respect to the capacitive detection circuit 21 (see FIG. 2) of the trainable transmitter 34 (see FIG. 2), the sensing electrode 60 of capacitive detection circuit 52 picks up the modulation signal of the remote transmitter. In one embodiment, during a training process initiated by a user, the user may be instructed to move remote transmitter 30 over the area of the sensing electrode 60 of capacitive detection circuit 21 (see FIG. 2). For example, information may be provided to the user during the training process via display 36. Also, the trainable transmitter may be configured to provide feedback to the user to indicate when remote transmitter 30 is in an optimum position. For example, a light emitting diode of display 36 (see FIG. 2) may be selectively lit by control circuit 22 to communicate certain information to the user, such as, whether the remote transmitter is in a proper position, whether the training process was successful, whether the trainable transmitter 34 is transmitting a wireless control signal, etc. In one embodiment, capacitive detection circuit 52 may include multiple sensing electrodes 60 that control circuit 22 (see FIG. 2) may scan through in order to find the best signal.

Returning to FIG. 4A, the control signal received by the sensing electrode 60 from the transmitter circuit may be small, for example, less than 1 mV. Accordingly, the control signal may be amplified to a more useful level, for example 1V, by an amplifier 54. To prevent excessive external noise from interfering, the frequency response of the amplifier 54 may be configured to be selective to the frequency of signals expected from remote transmitter 30 (see FIG. 2). The low pass frequency response may typically be about 300 Hz, though in some systems it may be up to 20 kHz. In one embodiment, control circuit 22 (see FIG. 2), which is used to control the training operation of trainable transmitter 34, sequences through different frequency responses of the amplifier 54 to adjust for the different expected signal types.

The signal received by the amplifier 54 from sensing electrode 60 may be distorted by the capacitive coupling. Each turn on transition of the data pulse in the transmitter will be represented by a positive pulse from the amplifier as shown by the exemplary received signal waveform 56 in FIG. 4B. Likewise, a turn off transition will yield a negative pulse as shown by the exemplary received signal waveform 56 shown in FIG. 4B. Control circuit 22 (see FIG. 2) may then reconstruct the data pattern based on the pulses of the received signal 56.

Figure 4B:
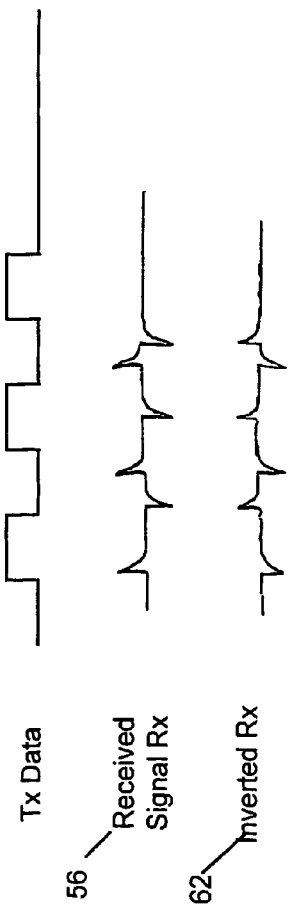
FIG. 4B shows an exemplary set of waveforms for the capacitive detection circuit of FIG. 4A in accordance with an embodiment.

Depending on the design of transmitter circuit 20 (see FIG. 2), however, it is possible that the turn on transition in the transmitter could produce a negative pulse. Control circuit 22 may be configured to determine if the data reconstructed from the pulses should be inverted. FIG. 4B includes an exemplary inverted received signal waveform 62. Several possible methods may be used to determine whether the data should be inverted. For example, many codes have a duty cycle less than 50%, i.e., the signal is off more than it is on. Accordingly, the pattern of the data could be checked to determine the duty cycle. If the duty cycle is more than 50%, it would likely need to be inverted. In another embodiment, a second method may be used in which knowledge of the likely data patterns or characteristics of the signal provided by the remote transmitter is used. The learned data pattern is compared to expected patterns stored in a memory of the control circuit. When a match is found, the polarity of the signal can be adjusted to match the expected pattern. The data pattern detected and identified using capacitive detection circuit 21 (see FIG. 2) is stored in memory by the control circuit for subsequent use.

Returning to FIG. 2, for the signal to be retransmitted by the transmitter circuit 20, the correct carrier frequency is needed. Various methods may be used for determining the carrier frequency for a learned control signal. Several methods are described in co-pending U.S. Provisional Patent Application No. 60/448,993, filed Feb. 21, 2003, entitled "Trainable Transceiver and Method for Determining the Frequency of a Learned Control signal," herein incorporated by reference. For example, in one embodiment, characteristics of detected data of the control signal may be used to identify the appropriate frequency or frequencies for retransmitting the signal. Various data characteristics may be used, for example, the number of bits in the control signal or message, the high and low timing of individual bits in the data, the ratio of high and low timing of individual bits, the presence of a specific preamble, the absence of a preamble, the packet to packet time, the duration of time between packets (idle time), the time of the packet, whether the data is continuous, the ratio of the time of a single bit or bits of the preamble compared to the time of the other bits, patterns of bits including the repetition of bits, certain bits in the sequence being a 0 or a 1, the type of modulation method used (e.g., PPM (Pulse Position Modulation), PWM (Pulse Width Modulation), or Manchester), the minimum time the signal is high, the ratio of the packet to packet time and the minimum time the signal is high, etc. The identified data characteristic or characteristics may be used to determine the type of remote system (e.g., the particular manufacturer of the remote system corresponding to the remote transmitter 30 and electronic system 32). The system type information (e.g., a particular manufacturer or a remote system of a particular manufacturer) is used by control circuit 52 to determine or identify a transmission frequency (or RF carrier frequency) or frequencies that may be used by transceiver 50 to transmit the control code for the electronic system 62. In another embodiment, where the remote transmitter and remote electronic system use a rolling control code, the characteristics of the control code may also be used to identify the appropriate cryptographic algorithm (and the data required for input to the cryptographic algorithm) to produce the rolling control code. Control circuit 22 may include a memory that is configured to store information regarding the data characteristics of control signals for various remote control system manufacturers (and/or various remote control systems) as well as the appropriate transmission frequency or frequencies for those systems.

In alternative embodiments, the control data of the control signal of the remote transmitter 30 could be determined by replacing the battery or sensing the current drawn by the remote transmitter 30.

As discussed above, control circuit 22 uses the data from the control signal sensed by the capacitive detection circuit 21 to learn the control code required to control the remote electronic system 32. The control code and an appropriate carrier frequency are associated with one of the switches 42, 44 and 46. Once the RF channel associated with one of the switches 42, 44 and 46 has been trained to the control code and frequency of the control signal B, transmitter circuit 20 may subsequently transmit an RF signal T having the same characteristics as the control signal B to actuate remote electronic system 32 when the corresponding switch is, for example, momentarily depressed. As mentioned above, each RF channel of trainable transmitter 34 may be trained to a different RF control signal such that a plurality of devices or systems may be activated by, for example, depressing a corresponding one of the switches. Such other devices or systems, may include, for example, additional garage door openers, a building's interior or exterior lights, a home security system or any other household appliance or system capable of receiving an RF control signal.

Figure 5:
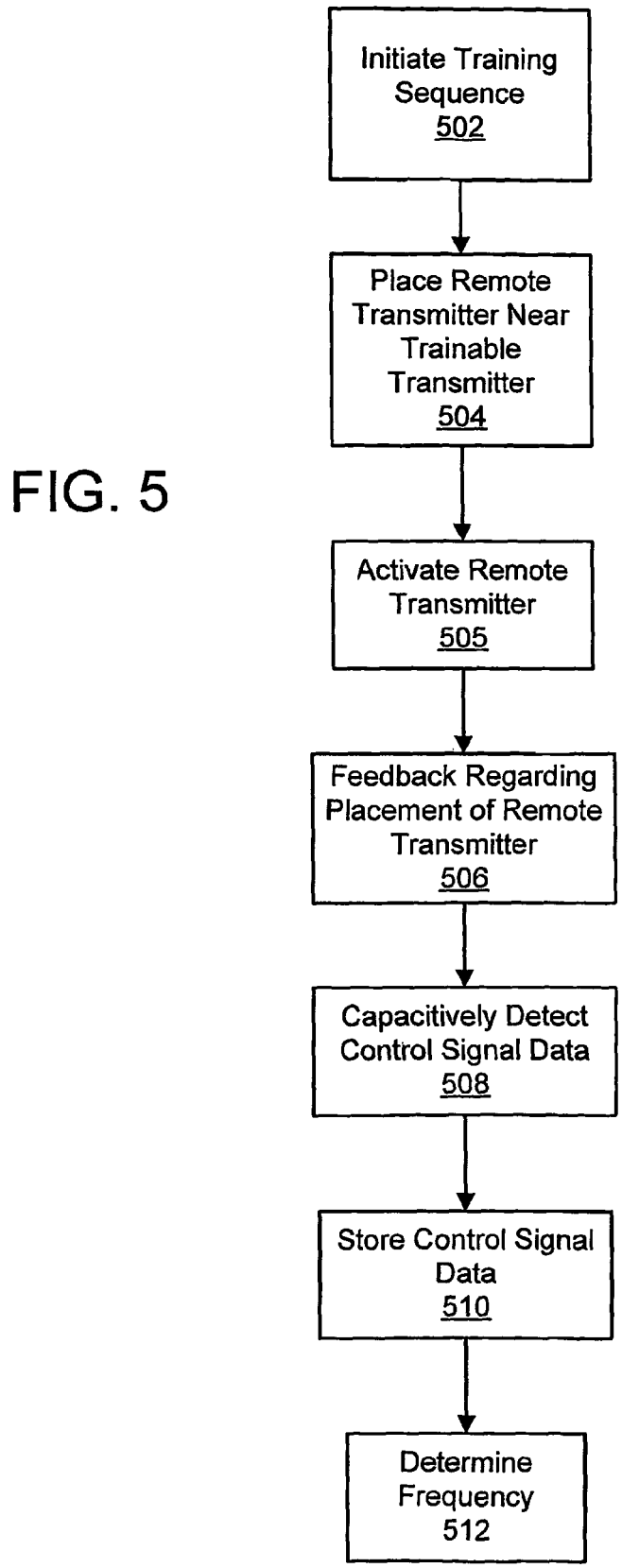
FIG. 5 illustrates a method for training a trainable transmitter in accordance with an embodiment.

FIG. 5 illustrates a method for training a trainable transmitter in accordance with an embodiment. At block 502, a training sequence is initiated by, for example, actuating a push button, by a message on a vehicle bus (if the transceiver is mounted in a vehicle), a combination of key presses, selecting a menu item on a display, etc. At block 504, a user places a remote transmitter (to which the transmitter is to be trained) near the trainable transmitter. Preferably, as discussed above, the remote transmitted is placed near the sensing electrode of the capacitive detection circuit. At block 505, the remote transmitter is activated to send an RF control signal. As discussed above, the trainable transmitter may provide feedback to the user at block 506 to indicate proper placement of the remote transmitter. For example, a light emitting diode of display 36 (see FIG. 2) may be selectively lit by control circuit 22 to communicate to the user whether the remote transmitter is in a proper position. At block 508, data (e.g., modulation data) of the control signal of the remote transmitted is capacitively detected using a capacitive detection circuit. The data is stored in a memory at block 510 and may be associated with a switch of the trainable transmitter for use in generating an RF signal for transmission to a remote electronic system. At block 512, the frequency or frequencies for retransmission of the control signal are determined.

It is also important to note that the construction and arrangement of the elements of the trainable transmitter as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, circuit elements, etc.) without materially departing from the novel teachings and advantages of the subject matter recited herein. Accordingly, all such modifications are intended to be included within the scope of the present invention as described herein. The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

What is claimed is:

1. A system for detecting data for training a trainable transmitter used to subsequently transmit a modulated RF signal having the detected data, the system comprising:
   an antenna;
   a capacitive detection circuit coupled to the antenna and configured to detect data provided in a control signal of a remote control transmitter used to remotely activate a device; and
   a control circuit coupled to the capacitive detection circuit and configured to store the detected data and to generate the RF signal having the detected data to be transmitted by the trainable transmitter to actuate the device; and
   wherein the trainable transmitter does not include an RF receiver and wherein the control signal of the remote control transmitter is normally used to remotely activate the device via remote RF transmission;
   wherein the control circuit is configured to reconstruct a data pattern to be transmitted to the device based on the detected data;
   wherein the control circuit is configured to analyze the duty cycle of the detected data to determine whether the detected data should be inverted as a part of the reconstruction of the data pattern to be transmitted to the device;
   wherein the control circuit is configured to compare the detected data to data patterns stored in memory of the control circuit; and wherein the control circuit is configured to adjust the polarity of the detected data as a part of the reconstruction of the data pattern based on the comparison of the detected data to the data patterns stored in memory of the control circuit; and
   wherein the capacitive detection circuit includes a plurality of sensing electrodes and wherein the control circuit scans the plurality of sensing electrodes in order to find a best control signal.

2. A system according to claim 1, wherein the capacitive detection circuit is configured to detect modulation data of the control signal.

3. A system according to claim 2, wherein the control signal is modulated using an On-Off Keying modulation technique.

4. A system according to claim 1, wherein the control circuit is configured to generate a request for a user to place the remote control transmitter at a distance from the capacitive detection circuit.

5. A system according to claim 4, wherein the control circuit is further configured to provide a feedback to the user indicating that the remote control transmitter is at the distance.

6. A system according to claim 1, wherein the capacitive detection circuit includes a reference electrode and a sensing electrode.

7. A system according to claim 1, wherein the control circuit is further configured to determine a frequency of transmission for the control signal.

* * * * *

UNITED STATES PATENT AND TRADEMARK OFFICE
CERTIFICATE OF CORRECTION

PATENT NO. : 8,330,569 B2  
APPLICATION NO. : 10/558121  
DATED : December 11, 2012  
INVENTOR(S) : Blaker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 973 days.

Signed and Sealed this
Fifth Day of August, 2014

Michelle K. Lee
*Deputy Director of the United States Patent and Trademark Office*